(12) United States Patent
Zhang et al.

(10) Patent No.: US 11,318,724 B2
(45) Date of Patent: May 3, 2022

(54) FILM FOR MEDICINE PACKAGING AND METHOD OF PREPARING THE SAME

(71) Applicant: Sichuan Huili Industry Co., Ltd., Sichuan (CN)

(72) Inventors: Hui Zhang, Sichuan (CN); Jinzhi Bai, Sichuan (CN); Bin Yan, Sichuan (CN)

(73) Assignee: Sichuan Huili Industry Co., Ltd., Sichuan (CN)

(*) Notice: Subject to any disclaimer, the term of this patent is extended or adjusted under 35 U.S.C. 154(b) by 210 days.

(21) Appl. No.: 16/880,142

(22) Filed: May 21, 2020

(65) Prior Publication Data

US 2020/0282714 A1    Sep. 10, 2020

Related U.S. Application Data

(62) Division of application No. 16/240,373, filed on Jan. 4, 2019, now Pat. No. 10,703,080.

(30) Foreign Application Priority Data

Sep. 3, 2018 (CN) .......................... 201811020242.1

(51) Int. Cl.

| | |
|---|---|
| *B32B 7/12* | (2006.01) |
| *B32B 27/34* | (2006.01) |
| *B32B 9/00* | (2006.01) |
| *B32B 37/12* | (2006.01) |
| *C08F 20/28* | (2006.01) |
| *C08F 20/56* | (2006.01) |
| *C08J 5/18* | (2006.01) |
| *C08K 5/315* | (2006.01) |
| *C08K 5/38* | (2006.01) |

(52) U.S. Cl.
CPC ................ *B32B 27/34* (2013.01); *B32B 7/12* (2013.01); *B32B 9/007* (2013.01); *B32B 37/1207* (2013.01); *C08F 20/28* (2013.01); *C08F 20/56* (2013.01); *C08J 5/18* (2013.01); *C08K 5/315* (2013.01); *C08K 5/38* (2013.01); *B32B 2310/14* (2013.01); *B32B 2439/80* (2013.01); *C08F 2438/03* (2013.01)

(58) Field of Classification Search
CPC ........... B32B 27/34; B32B 9/007; B32B 7/12; B32B 37/1207; B32B 2439/80; B32B 2310/14; C08F 20/56; C08F 20/28; C08F 2438/03; C08K 5/315; C08K 5/38; C08J 5/18

See application file for complete search history.

(56) References Cited

U.S. PATENT DOCUMENTS

2012/0301707 A1   11/2012   Kinloch et al.

FOREIGN PATENT DOCUMENTS

CN           103381934 A       11/2013

OTHER PUBLICATIONS

Czech, Z., et al., "Influence of selected photoinitiators type II on tack, peel adhesion, and shear strength of UV-crosslinked solvent-borne acrylic pressure-sensitive adhesives used for medical applications," Polymer Bulletin, 2012, 68:441-452, Springer-Verlag 2011.
Cismaş, C. et al., "exo-N-[2-(4-Azido-2,3,5,6-tetrafluorobenzamido)ethyl]-dC: a novel intermediate in the synthesis of dCTP derivatives for photoaffinity labelling," Tetrahedron Letters, 2008, 49:1336-1339, 2007 Elsevier Ltd.
Restriction Requirement dated Jan. 10, 2020 in U.S. Appl. No. 16/240,373.
Notice of Allowance dated Mar. 30, 2020 in U.S. Appl. No. 16/240,373.

*Primary Examiner* — Samir Shah
(74) *Attorney, Agent, or Firm* — Saliwanchik, Lloyd & Eisenschenk

(57) ABSTRACT

The present invention discloses a film for a medicine packaging and a method of preparing the same. The film for the medicine packaging includes a polymer film layer, a graphene composite layer and a light-curable adhesive, wherein the polymer film layer is bonded with a graphene composite layer by a light-curable adhesive, the graphene composite layer includes multiple graphene layers bonded by the light-curable adhesive; and the light-curable adhesive includes a hyperbranched cationic mussel-imitated polymer including a multi-hydroxylbenzoylbenzamide ene amide monomer, a cationic monomer and a photo-responsive monomer. The present invention provides strong adhesion with reduced adhesive layer, allowing greatly increasing the number of the graphene layers in the graphene composite layer without obvious increase in the total thickness and mass. This can meet the requirements of the medicine packaging material, as it obviously lowers the film's permeation to water vapor and oxygen and significantly enhances the tensile strength.

6 Claims, No Drawings

FILM FOR MEDICINE PACKAGING AND METHOD OF PREPARING THE SAME

CROSS-REFERENCE TO RELATED APPLICATIONS

This application is a divisional of U.S. application Ser. No. 16/240,373, filed Jan. 4, 2019; which claims the benefit under 35 U.S.C. § 119 of Chinese Application No. 201811020242.1, filed Sep. 3, 2018, which is hereby incorporated in its entirety.

FIELD OF THE INVENTION

The present invention relates to the field of packaging material, and more particularly to a film for a medicine packaging and a method of preparing the same.

BACKGROUND OF THE INVENTION

As the main packaging material for the pharmaceuticals, polymer film packaging material has become increasingly important in daily life. However, affected by the production processes and physicochemical characteristics of the plastic films, the barrier properties of the plastic films to oxygen, water vapor, liquid substances and other low molecular weight substances are difficult to meet the requirements of most medicine packaging. The penetration of small molecular gases such as oxygen and water vapor into the packaging materials may cause the oxidation deterioration of the active ingredients in the drug, which gives rise to some phenomena like the proliferation of microorganisms, significantly shortening the shelf life of the drug. Therefore, the improvement of the barrier properties of plastic films to small molecular gases such as oxygen and water vapor and the possession of antibacterial properties are of great importance to improve the quality of the plastic films.

Graphene is a two-dimensional carbon nanomaterial, wherein each carbon atom connects with the other three carbon atoms to form covalent bonds by means of $sp^2$ hybridization, and then arrange into a honeycomb hexagonal lattice. The remaining single electron 2P orbital of each carbon atom coincides with each other to form a delocalized conjugated π bond. The six-membered ring of the graphene has a pore size of only 0.15 nm which is smaller than that of helium, and has natural gas barrier properties. Meanwhile, the transmittance of the single-layered graphene to visible light reaches up to 97%, allowing that the single-layered graphene can be used to easily produce film materials with excellent light transparency under suitable process conditions. Also, the single-layered graphene has a thickness of only 0.34 nm and a width ranging from a few microns to tens of centimeters. The aforementioned characteristics and properties make graphene to be an ideal nanometer barrier material.

At present, one of the methods of using graphene to prepare a polymer film is to adopt an adhesive to bond the graphene film material and the polymer film together. Nonetheless, due to the small contact area and a few reaction sites between the existing adhesive and the graphene, the safety and bonding strength of the film are poor. Meanwhile, uneven coating of the adhesive causes not only a poor boding strength between the graphene film and the polymer film, but also the difference in the thickness throughout the graphene film, resulting in differences in barrier properties of the medicine packaging, which is difficult to meet the requirements of the medicine packaging. Moreover, the existing preparation process for the polymer film is highly polluting and has a complicated post-treatment process, which cause a high production cost.

BRIEF SUMMARY OF THE INVENTION

The present invention aims to provide a film for a medicine packaging and a method of preparing the same, so as to solve the problems that the barrier property of the existing medicine packaging is poor, and the preparation process thereof is highly polluting and has a complicated post-treatment process, which cause a high production cost.

The present invention is realized by the following technical solutions:

A film for a medicine packaging, comprising a polymer film layer, wherein the polymer film layer is bonded with a graphene composite layer by a light-curable adhesive, the graphene composite layer comprises a plurality of graphene layers, and two adjacent graphene layers of the plurality of the graphene layers are bonded by the light-curable adhesive; and the light-curable adhesive comprises a hyperbranched cationic mussel-imitated polymer, and the hyperbranched cationic mussel-imitated polymer comprises a multi-hydroxylbenzoylbenzamide ene amide monomer, a cationic monomer and a photo-responsive monomer.

In the prior art, Chinese patent having a patent number of CN103381934A discloses a food packing bag. The food packing bag comprises a graphene antibacterial layer and a plastic layer, wherein the edges of the graphene antibacterial layer and the plastic layer are bonded together by a flexible white emulsion. However, the adhesive used in the existing film material has a few reaction sites to chemically react with the graphene, which causes a poor bonding strength between the polymer film layer and the graphene layer, making the graphene layer of the bonded packaging film tend to peel off from the polymer film layer. Although the amount of the adhesive can be increased to obtain a better bonding effect, the thickness of the adhesive layer is increased, which lower the thickness of the graphene layer so that the total thickness is constant, resulting in a poor barrier property of the graphene layer that is difficult to meet the requirements of the medicine packaging.

To solve the aforementioned problems, the present invention provides a film for the medicine packaging. The film for the medicine packaging comprises a polymer film layer, wherein the polymer film layer can use the common polymer film for medicine packaging such as polypropylene (PP), polyethylene (PE), polyethylene terephthalate (PET), polyvinyl chloride (PVC), polybutylene terephthalate (PBT) and the like. The polymer film layer is bonded with a graphene composite layer by a light-curable adhesive, namely a first adhesive layer, and the graphene composite layer comprises a plurality of graphene layers. Two adjacent graphene layers of the plurality of the graphene layers are bonded by a second adhesive layer formed by the light-curable adhesive. That is to say that the second adhesive layer and the graphene layer are alternatively coated on the polymer film layer. Preferably, the number of layers of the plurality of the graphene layers in the graphene composite layer is 1-30.

The light-curable adhesive used in such technical solution comprises a hyperbranched cationic mussel-imitated polymer. The hyperbranched cationic mussel-imitated polymer comprises a multi-hydroxylbenzoylbenzamide ene amide monomer and a cationic monomer. Preferably, the multi-hydroxylbenzoylbenzamide ene amide monomer is N-(2-acrylamidoethyl)-4-(2,3,4-trihydroxybenzoyl)benzamide, N-(2-acrylamidoethyl)-4-(3,4-dihydroxybenzoyl)benzamide or N-(2-acrylamidoethyl)-3-(2,3,4-trihydroxybenzoyl)benzamide. The cationic monomer is any one of N-(2-aminoethyl)acrylamide hydrochloride, N-(2-aminoethyl) methacrylamide hydrochloride, N-(3-aminopropyl) acrylamide hydrochloride, N-(3-aminopropyl) methacrylamide hydrochloride, N-(4-aminobutyl) acrylamide hydrochloride, N-(4-aminobutyl) methacrylamide hydrochloride, N-(6-aminohexyl) acrylamide hydrochloride, N-(6-aminohexyl) methacrylamide hydrochloride or (2-aminoethyl) methacrylate hydrochloride.

The multi-hydroxylbenzoylbenzamide ene amide monomer has a large amount of free catechol groups. In the presence of the cationic end groups, the bonding force of the catechol groups to the polymer film layer can be enhanced by synergistic action between the catechol groups and the cationic end groups. Besides, a large amount of free catechol groups and the cationic end groups allows the hyperbranched cationic mussel-imitated polymer to have good adhesions to various kinds of polymer film layers through a series of intermolecular forces with different strength such as van der Waals force, hydrogen bonding, the interacting force between cationic and pi and the like. Thus, the bonding strength between the polymer film layer and the adhesive prepared by the hyperbranched cationic mussel-imitated polymer comprising the multi-hydroxylbenzoylbenzamide ene amide monomer and the cationic monomer can be enhanced significantly.

The hyperbranched cationic mussel-imitated polymer further comprises a photo-responsive monomer. Preferably, the photo-responsive monomer can be any one of N-(2-acrylamidoethyl)-4-azido-2,3,5,6-tetrafluorobenzamide, N-(2-acrylamidoethyl)-4-azido-2,3,5-trifluorobenzamide, N-(2-acrylamidoethyl)-4-azido-2,5-difluorobenzamide or N-(2-acrylamidoethyl)-4-azidobenzamide.

Apart from the intermolecular force between the photo-responsive monomer and graphene molecule, the photo-responsive monomer can generate a benzene ring radical under action of light. The benzene ring radical may attack the C—H bond on the graphene molecule and chemically react to form the covalent bond, which the latter greatly improve the bonding strength between the polymer and the graphene molecule.

In sum, the light-curable adhesive prepared by the hyperbranched cationic mussel-imitated polymer significantly enhances the bonding strength between the adhesive and the polymer film layer, as well as the bonding strength between the adhesive and the graphene layers. The strong adhesion can be obtained with a less amount of adhesive so that the total thickness of the adhesive layers which include the first adhesive layer and the second adhesive layers is reduced, allowing the number of layers of the graphene layers in the graphene composite layer to increase greatly without the change in the total thickness and obvious increase in the total mass, which not only meets the requirements of the medicine packaging material, but also obviously lowers the water vapor transmission and oxygen transmission, and significantly enhances the tensile strength.

As a preferred structure of the hyperbranched cationic mussel-imitated polymer provided in the present invention, the hyperbranched cationic mussel-imitated polymer has a structure of formula (I):

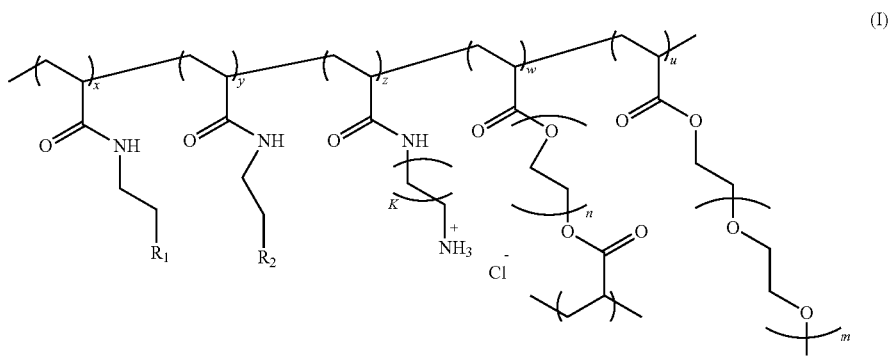

wherein x is 1-10, y is 20-80, z is 30-80, w is 5-20, u is 20-80, K is 1-5, n is 10-50, and m is 5-30;

wherein $R_1$ is a chemical group having a structure of formula (II):

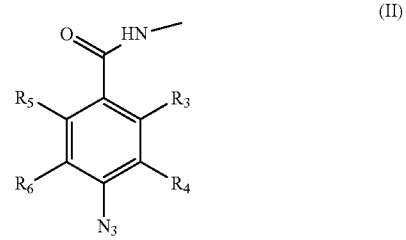

wherein $R_3$, $R_4$, $R_5$ or $R_6$ is individually selected from the group consisting of hydrogen and halogen; and wherein $R_2$ is a chemical group selected from the group consisting of

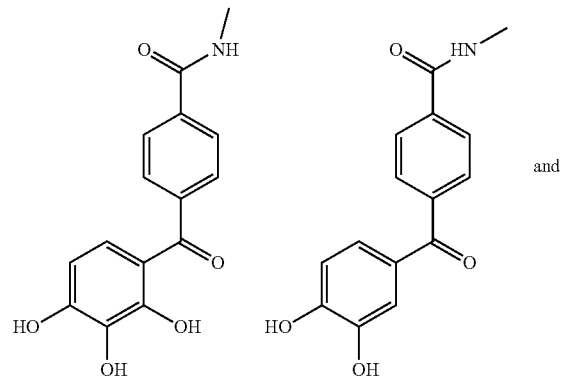

and

-continued

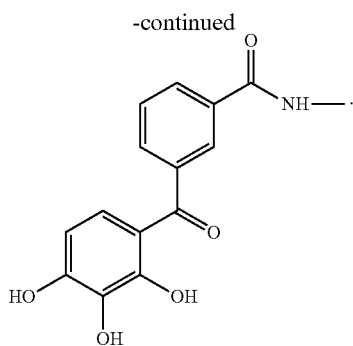

As shown in formula (II), the groups of $R_3$, $R_4$, $R_5$ and $R_6$ in $R_1$ can partially or totally be halogen. Preferably, the groups of $R_3$, $R_4$, $R_5$ and $R_6$ can partially or totally be fluorine. Under light condition, the number of the covalent bonds formed between fluorine and graphene is tunable, so that the binding strength between the hyperbranched polymer and graphene is changeable according to the light intensity, which allows the adhesive strength of the adhesive to be adjusted depending upon the specific demands, and makes the adhesive more suitable for the graphene film packaging material. Preferably, the polymerization degree of the hyperbranched polymer is from 100 to 400. Further preferably, K is 1-3, n is 20-30, and m is 10-20.

Compared with the traditional small molecule adhesive and the common polymer adhesive, the hyperbranched cationic mussel-imitated polymer disclosed in the present invention has excellent mussel-imitated non-selective adhesive property, good biocompatibility and adhesive strength adjustability.

Furthermore, in formula (II), $R_3$, $R_4$, $R_5$ or $R_6$ is individually selected from the group consisting of hydrogen and fluorine.

As a preferred structure of $R_1$, $R_1$ is selected from the group consisting of

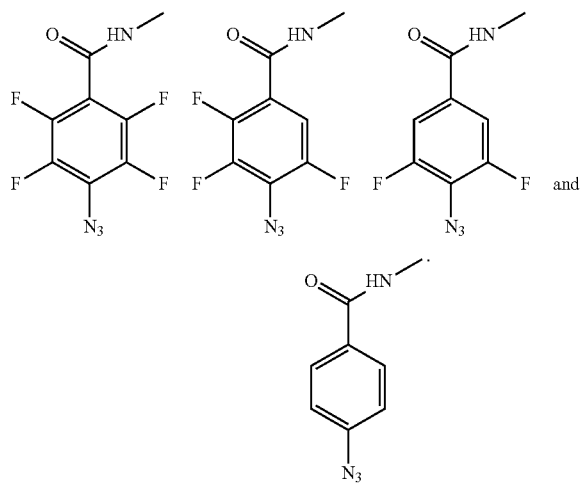

Furthermore, a thickness of the graphene composite layer is 10-200 nm. Preferably, the graphene composite layer having a thickness of 30-70 nm allows the film for the medicine packaging to have good light transmittance, gas permeability and quality.

The present invention further provides a method of preparing the aforementioned film for medicine packaging, which comprises following steps:

(A) using the reversible addition fragmentation chain transfer polymerization method to prepare the hyperbranched cationic mussel-imitated polymer, and formulating the prepared hyperbranched cationic mussel-imitated polymer into an aqueous solution of the light-curable adhesive;

(B) preparing a reduced graphene oxide solution;

(C) spraying the aqueous solution of the light-curable adhesive prepared in the step (A) on the polymer film layer to form a first adhesive layer, then spraying the reduced graphene oxide solution prepared in the step (B) on the first adhesive layer to form one of the plurality of the graphene layers, and curing the first adhesive layer under a light condition;

(D) spraying the aqueous solution of the light-curable adhesive prepared in the step (A) on the one of the plurality of the graphene layers prepared in the step (C) to form a second adhesive layer, then spraying the reduced graphene oxide solution prepared in the step (B) on the second adhesive layer to form another one of the plurality of the graphene layers, and then curing the second adhesive layer under the light condition; and (E) repeating the step (D) until a desired number of layers of the plurality of the graphene layers in the graphene composite layer being achieved.

In the step (A), the reversible addition fragmentation chain transfer polymerization method (RAFT) is used to prepare the hyperbranched cationic mussel-imitated polymer, which the latter comprises a multi-hydroxylbenzoyl-benzamide ene amide monomer, a cationic monomer and a photo-responsive monomer. Later, the prepared hyperbranched cationic mussel-imitated polymer is formulated into an aqueous solution of the light-curable adhesive having a concentration of 0.5-5.0 mg/mL for subsequent use.

In the step (B), the graphene oxide can either be commercially available, or be prepared by Hummers method. Then the graphene oxide may be reduced by a reducing agent to obtain a dispersive and stable reduced graphene oxide solution. Preferably, the reducing agent can be any one of sodium ascorbate, hydroiodic acid, hydrazine hydrate or sodium borohydride.

In the step (C), first, the aqueous solution of the light-curable adhesive is evenly sprayed on the polymer film layer to form the first adhesive layer. Then the reduced graphene oxide solution is sprayed on the first adhesive layer to form one of the plurality of graphene layers. Preferably, the concentration of the reduced graphene oxide solution is 0.01-5 mg/mL. Later, the film is subjected to the light to cure the adhesive. Prior to carrying out the step (C), the surface of the polymer film can be cleaned with water to remove contaminants thereon, improving the adhesion of the surface of polymer film.

In the prior art, before the adhesive is sprayed on the polymer film, the polymer film is typically subjected to a corona treatment. In the present invention, the multi-hydroxylbenzoylbenzamide ene amide monomer comprises a large amount of catechol groups which can form various intermolecular forces such as hydrogen bonding, van der Waals force, the interacting force between cationic and pi and the like with the surface of the polymer film, thereby bonding firmly with the surface of the polymer film. Therefore, the aqueous solution of the light-curable adhesive sprayed on the surface of the polymer film layer can bind with the polymer film layer firmly even without the corona treatment, which not only lowers the process cost and simplifies the process steps, but also shortens the process time, having a wide promotional value.

In the step (D), a plurality of second adhesive layers and a plurality of graphene layers are sprayed alternatively on the graphene layer formed in the step (C). After each of the plurality of the second adhesive layers and each of the plurality of the graphene layers is sprayed, the each of the plurality of the second adhesive layers is cured under illumination. Finally, the graphene composite layer with a desired number of layers of graphene layers is obtained. Preferably, the number of layers of graphene layers in the graphene composite layer is 1-30.

In the process described above, the graphene composite layer formed by alternatively spraying the second adhesive layer and the graphene layer has high barrier property. Meanwhile, after each time the second adhesive layer is sprayed, the second adhesive layer is cured under illumination, which not only improves the adhesive strength, but also shortens the process time. Furthermore, the preparation process ensuring the same coating effect reduces the corona treatment used in the prior art, which not only lowers the process cost and simplifies the process steps, but also shortens the process time, having a wide promotional value.

Furthermore, the step (A) comprises following steps:

(A1) adding an initiator, a RAFT agent and a first reaction mixture to a vessel containing DMF to form a second reaction mixture;

(A2) stirring the second reaction mixture until homogenous, and introducing argon to a reaction system to remove oxygen therein;

(A3) heating and stirring the second reaction mixture to carry out a reaction;

(A4) after a product with a desired molecular weight being produced, the reaction system being exposed to air and cooled rapidly in a cold water bath to terminate the reaction;

(A5) purifying the product to obtain the hyperbranched cationic mussel-imitated polymer; and (A6) formulating the hyperbranched cationic mussel-imitated polymer into the aqueous solution of the light-curable adhesive having a concentration of 0.5-5 mg/mL;

wherein the first reaction mixture comprises a multi-hydroxylbenzoylbenzamide ene amide monomer, a cationic monomer, a photo-responsive monomer, poly(ethylene glycol) diolefine acid ester and poly(ethylene glycol) olefine acid ester.

At first, the initiator, the RAFT agent, the multi-hydroxylbenzoylbenzamide ene amide monomer, the cationic monomer, the photo-responsive monomer, poly(ethylene glycol) diolefine acid ester, and poly(ethylene glycol) olefine acid ester are added to a round bottom flask containing DMF (i.e., N,N-dimethylformamide), and are stirred until homogenous. Preferably, the initiator has a concentration of 0.012M. Next, argon is introduced to the reaction system to remove oxygen. Preferably, argon is introduced for 20-25 minutes. Then the round bottom flask is placed in an oil bath, and the mixture in the round bottom flask is heated and stirred, wherein the preferred oil bath temperature is 60-90° C., and the preferred stirring speed is 600-800 rmp. After the reaction is reached the expected conversion as well as the product with the desired molecular weight is produced, the round bottom flask is placed in the cold water bath to rapidly cool the reaction system. Later, the crude product is purified to obtain a light brown hyperbranched cationic mussel-imitated polymer. Preferably, the solvent used for purification is dichloromethane and diethyl ether. After purification, the hyperbranched cationic mussel-imitated polymer is formulated into the aqueous solution of the light-curable adhesive having a concentration of 0.5-5 mg/mL.

Preferably, poly(ethylene glycol) diolefine acid ester is either poly(ethylene glycol) diacrylate or poly(ethylene glycol) dimethacrylate, and can be used to adjust the esterification degree of the hyperbranched polymer. Poly(ethylene glycol) olefine acid ester is either poly(ethylene glycol) methyl ether acrylate or poly(ethylene glycol)methyl ether methacrylate, and can be used to adjust the solubility of the hyperbranched polymer. Preferably, the molecular weight of the polyethylene glycol ranges from 200 to 6000.

Furthermore, the multi-hydroxylbenzoylbenzamide acylamide monomer has a molar percentage of 20-40%, the cationic monomer has a molar percentage of 30-40%, the photo-responsive monomer has a molar percentage of 1-5%, poly(ethylene glycol) olefine acid ester has a molar percentage of 20-40%, and poly(ethylene glycol) diolefine acid ester has a molar percentage of 5-10%.

Furthermore, in the step (A1), the initiator, the RAFT agent and the first reaction mixture are in a molar ratio of 1:2:100.

Furthermore, the initiator is 1,1-azobis(cyclohexanecarbonitrile), 2,2'-azobis(2-methylpropionitrile) or 4,4'-azobis(4-cyanovaleric acid); and the RAFT agent is any one of 2-(dodecyltrithiocarbonate)-2-methylpropionic acid, 4-cyano-4-(phenylthioformylthio)pentanoic acid or 2-cyano-2-propyl-4-cyanobenzene dithiocarbonate.

The present invention improves the existing preparation method of the reduced graphene oxide solution.

The step (B) of the method of preparing the film for the medicine packaging specifically comprises the following steps:

(B1) adding graphite powder to concentrated sulfuric acid, stirring until homogenous in an ice water bath and then adding potassium permanganate, controlling a temperature of the ice water bath within a range of 10-15° C., and reacting for 2 hours;

(B2) transferring a reaction solution obtained in step (B1) to a water bath to react at a constant temperature of 35° C. for 30 minutes, continually stirring the reaction solution and adding distilled water to the reaction solution, and thereafter reacting at a temperature of 80° C. for 15 minutes;

(B3) adding a certain amount of 15 wt % hydrogen peroxide to the reaction solution until generation of bubbles, hot filtering the reaction solution, washing a filter cake with hydrochloric acid and deionized water until a filtrate being neutral, and obtaining an aqueous solution of graphene oxide;

(B4) diluting the aqueous solution of graphene oxide with deionized water, and ultrasonically treating the aqueous solution of graphene oxide for 1 hour to obtain a graphene oxide solution having a concentration of 0.1-5.0 mg/mL; and (B5) mixing the prepared graphene oxide solution and a reducing agent at a mass ratio of 1:3, reacting at a room temperature for 2 minutes, and diluting to obtain the reduced graphene oxide solution with a required concentration.

The aforementioned technical solution improves the existing Hummers method for preparation of graphene oxide. On the one hand, the total reaction time is less than 3 hours which is far less than that of the existing Hummers method, and the steps such as standing step and drying step can be removed, effectively improving the production efficiency. On the other hand, the entire reaction process uses water as the solvent so that the preparation conditions are environmentally friendly, and the post-treatment process is simpler, lowering the production cost.

Compared with the prior art, the present invention has the following advantages and beneficial effects:

1. The light-curable adhesive prepared by the hyperbranched cationic mussel-imitated polymer significantly enhances the bonding strength between the adhesive and the polymer film layer, as well as the bonding strength between the adhesive and the graphene layers. The strong adhesion can be obtained with a less amount of adhesive so that the total thickness of the adhesive layers comprising the first adhesive layer and the second adhesive layers is reduced, allowing the number of layers of the graphene layers in the graphene composite layer to increase greatly without the change in the total thickness and obvious increase in the total mass, which not only meets the requirements of the medicine packaging material, but also obviously lowers the water vapor transmission and oxygen transmission, and significantly enhances the tensile strength.

2. The graphene composite layer of the present invention formed by alternatively spraying the second adhesive layer and the graphene layer has high barrier property. Meanwhile, after each time the second adhesive layer is sprayed, the second adhesive layer is cured under illumination, which not only improves the adhesive strength, but also shortens the process time. Furthermore, the preparation process ensuring the same coating effect reduces the corona treatment used in the prior art, which not only lowers the process cost and simplifies the process steps, but also shortens the process time, having a wide promotional value.

3. The present invention improves the existing Hummers method for preparation of graphene oxide. On the one hand, the total reaction time is less than 3 hours which is far less than that of the existing Hummers method, and the steps such as standing step and drying step can be removed, effectively improving the production efficiency. On the other hand, the entire reaction process uses water as the solvent so that the preparation conditions are environmentally friendly, and the post-treatment process is simpler, lowering the production cost.

DETAILED DESCRIPTION OF THE PREFERRED EMBODIMENTS

In order to make the objects, the technical solutions and the advantages of the present invention clearer, the present invention is now further described in details below with reference to the embodiments or examples. The illustrative embodiments of the present invention and the description thereof are merely for purpose of illustration, and are not intended to limit the invention to the precise embodiments disclosed.

All the raw materials of the present invention are not particularly limited in their sources, and are commercially available or can be prepared in accordance with the conventional methods known to those skilled in the art. For example, the photo-responsive monomer can be synthesized by the esterification reaction, and the multi-hydroxylbenzoylbenzamide acylamide monomer can be synthesized according to the method disclosed in [J] Polymer Bulletin, 2012, 68, 441-452, and in [J] Tetrahedron Letters, 2008, 49, 1336-1339.

All the raw materials of the present invention are not particularly limited in their purity. The present invention preferably employs the analytical purity or the conventional purity in the field of binder preparation.

The expressions of the substitutes in the present invention are not particularly limited, and use the expressions known to those skilled in the art. Based on the common sense, those skilled in the art can correctly understand the meanings of expressions of the substitutes.

All the brands and abbreviations of all the raw materials of the present invention belong to the conventional brands and abbreviations in the field. Each of the brands and abbreviations is clear in its relative fields. The raw materials may be purchased or prepared with the conventional methods by those skilled in the art according to their brands, abbreviations and corresponding use.

Example 1

Preparation of the Hyperbranched Cationic Mussel-Imitated Polymer P1

N-(2-acrylamidoethyl)-3-(2,3,4-trihydroxybenzoyl)benzamide, N-(2-aminoethyl)methacrylamide hydrochloride, N-(2-acrylamidoethyl)-4-azido-2,3,5,6-tetrafluorobenzamide, poly(ethylene glycol)methyl ether acrylate (i.e. PEGMEA), poly(ethylene glycol) diacrylate (i.e. PEGDEA) and the RAFT agent are added to a solution of N,N-dimethylformamide containing the initiator to form a second reaction mixture, wherein the initiator is 4,4'-azobis(4-cyanovaleric acid) and has a concentration of 0.012M. The polymerization of ethylene glycol in the PEGMEA is 15, and the polymerization of ethylene glycol in the PEGDEA is 22. 4,4'-azobis(4-cyanovaleric acid), the raft agent and the first reaction mixture formed by all the monomers involved in the polymerization are in a molar ratio of 1:2:100. The molar percentages of N-(2-acrylamidoethyl)-3-(2,3,4-trihydroxybenzoyl)benzamide, N-(2-aminoethyl)methacrylamide hydrochloride, N-(2-acrylamidoethyl)-4-azido-2,3,5,6-tetrafluorobenzamide, PEGDEA and PEGMEA are respectively 40%, 30%, 5%, 15% and 10%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P1. Thereafter, the hyperbranched cationic mussel-imitated polymer P1 is dissolved in ethanol and water (volume ratio is 1:1) to obtain an aqueous solution of the light-curable adhesive S1 having a concentration of 15 wt %.

The structure of the hyperbranched cationic mussel-imitated polymer P1 is as follows:

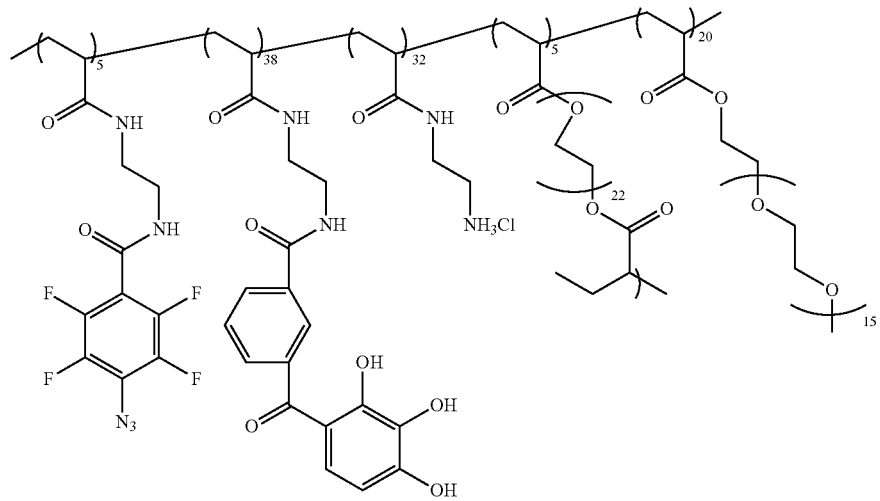

The detection result of the map for the structure of P1 is as follows:

$^1$H NMR (400 MHz, DMSO-D$_6$) δ(ppm) 7.90-8.2 (—NHCOC$_6$H$_4$CO—) 6.6-7.2 (C$_6$H$_2$(OH)$_3$), 5.35 (—C$_6$H$_3$(OH)$_2$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—);

$^{19}$F NMR (188 MHz, DMSO-D$_6$) δ(ppm) −134.69~−134.88(2F), −147.58~−147.71(2F).

Example 2

Preparation of the Hyperbranched Cationic Mussel-Imitated Polymer P2

N-(2-acrylamidoethyl)-4-(2,3,4-trihydroxybenzoyl)benzamide, N-(3-aminopropyl) acrylamide hydrochloride, N-(2-acrylamidoethyl)-4-azido-2,3,5,6-tetrafluorobenzamide, poly(ethylene glycol)methyl ether acrylate (i.e. PEGMEA), poly(ethylene glycol) diacrylate (i.e. PEGDEA) and the RAFT agent are added to a solution of N,N-dimethylformamide containing the initiator to form a second reaction mixture, wherein the initiator is 2,2'-azobis(2-methylpropionitrile) and has a concentration of 0.012M. The polymerization of ethylene glycol in the PEGMEA is 45, and the polymerization of ethylene glycol in the PEGDEA is 10. 2,2'-azobis(2-methylpropionitrile), the raft agent and the first reaction mixture formed by all the monomers involved in the polymerization are in a molar ratio of 1:2:100. The molar percentages of N-(2-acrylamidoethyl)-4-(2,3,4-trihydroxybenzoyl)benzamide, N-(3-aminopropyl) acrylamide hydrochloride, N-(2-acrylamidoethyl)-4-azido-2,3,5,6-tetrafluorobenzamide, PEGDEA and PEGMEA are respectively 20%, 33%, 2%, 35% and 10%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P2. Thereafter, the hyperbranched cationic mussel-imitated polymer P2 is dissolved in ethanol and water (volume ratio is 1:1) to obtain an aqueous solution of the light-curable adhesive S2 having a concentration of 15 wt %.

The structure of the hyperbranched cationic mussel-imitated polymer P2 is as follows:

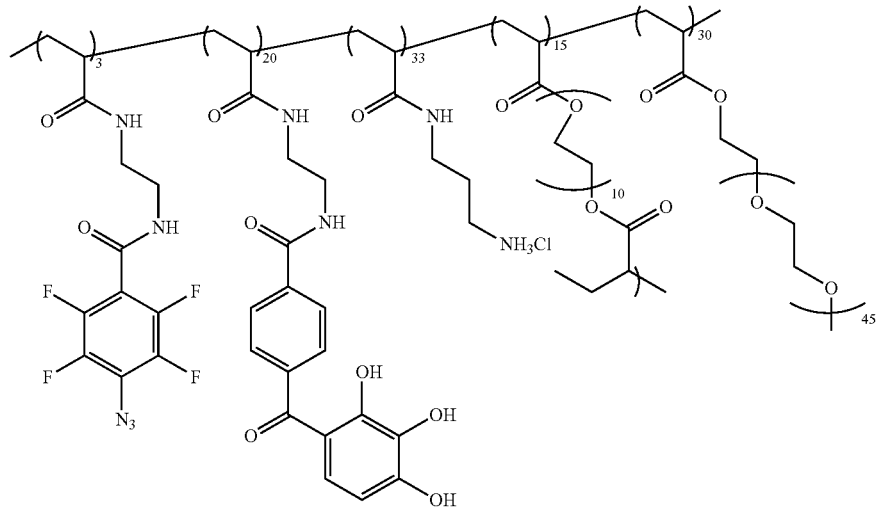

The detection result of the map for the structure of P2 is as follows:

$^1$H NMR (400 MHz, DMSO-D$_6$) δ(ppm):

7.90-8.2 (—NHCOC$_6$H$_4$CO—) 6.6-7.2 (C$_6$H$_2$(OH)$_3$), 5.35 (C$_6$H$_2$(OH)$_3$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—);

$^{19}$F NMR (188 MHz, DMSO-D$_6$) δ(ppm); −134.69~−134.88(2F), −147.58~−147.71(2F).

Example 3

Preparation of the Hyperbranched Cationic Mussel-Imitated Polymer P3

N-(2-acrylamidoethyl)-4-(3,4-dihydroxybenzoyl)benzamide, N-(4-aminobutyl) acrylamide hydrochloride, N-(2-acrylamidoethyl)-4-azidobenzamide, poly(ethylene glycol) methyl ether acrylate (i.e. PEGMEA), poly(ethylene glycol) diacrylate (i.e. PEGDEA) and the RAFT agent are added to a solution of N,N-dimethylformamide containing the initiator to form a second reaction mixture, wherein the RAFT agent is 2-(dodecyltrithiocarbonate)-2-methylpropionic acid, and the initiator is 2,2'-azobis(2-methylpropionitrile) and has a concentration of 0.012M. The polymerization of ethylene glycol in the PEGMEA is 5, and the polymerization of ethylene glycol in the PEGDEA is 8. 2,2'-azobis(2-methylpropionitrile), the raft agent and the first reaction mixture formed by all the monomers involved in the polymerization are in a molar ratio of 1:2:100. The molar percentages of N-(2-acrylamidoethyl)-4-(3,4-dihydroxybenzoyl) benzamide, N-(4-aminobutyl) acrylamide hydrochloride, N-(2-acrylamidoethyl)-4-azidobenzamide, PEGDEA and PEGMEA are respectively 25%, 35%, 5%, 30% and 5%. After the second reaction mixture is stirred uniformly, the argon is introduced to the reaction system for 20-25 minutes to remove the oxygen. Then the reaction system is stirred at a stirring speed of 700 rmp and reacted at a temperature of 70° C. until an expected conversion is reached and a product with a desired molecular weight is obtained. Later, the reaction system is exposed to air and cooled in a cold water bath to terminate the reaction. The product is further purified with dichloromethane and diethyl ether to obtain a light brown hyperbranched cationic mussel-imitated polymer P3. Thereafter, the hyperbranched cationic mussel-imitated polymer P3 is dissolved in ethanol and water (volume ratio is 1:1) to obtain an aqueous solution of the light-curable adhesive S3 having a concentration of 15 wt %.

The structure of the hyperbranched cationic mussel-imitated polymer P3 is as follows:

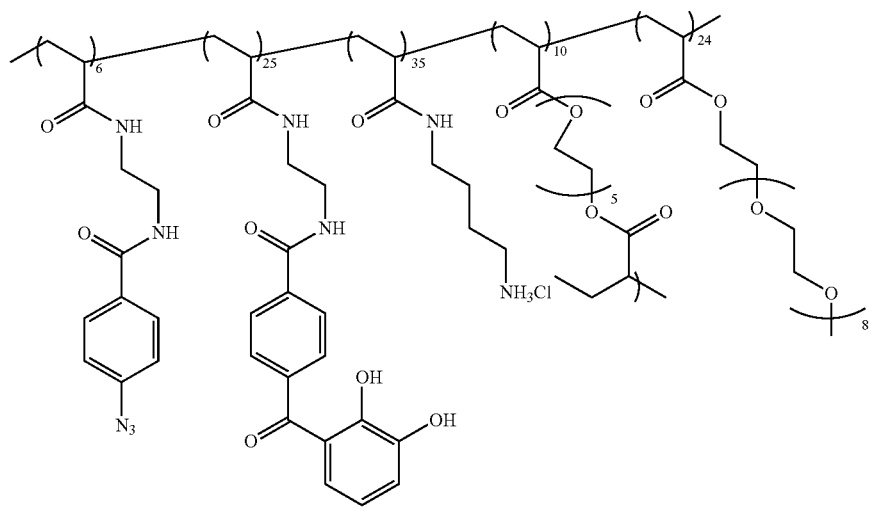

The detection result of the map for the structure of P3 is as follows:

$^1$H NMR (400 MHz, DMSO-D$_6$) δ(ppm) 7.90-8.2 (—NHCOC$_6$H$_4$CO—) 6.6-7.5 (N$_3$C$_6$H$_4$CO—, —C$_6$H$_3$(OH)$_2$), 5.35 (—C$_6$H$_3$(OH)$_3$), 4.32 (CH$_2$OOC—), 3.50-3.8 (—CH$_2$CH$_2$O—, —OCNHCH$_2$CH$_2$—), 3.22 (CH$_3$O—), 3.03 (—OCNHCH$_2$CH$_2$NH$_3$Cl), 2.16 (—CH$_2$CHCO—), 1.25-1.96 (—CH$_2$CHCO—).

Example 4

Preparation of the Films for Medicine Packaging M1, M2 and M3

At first, the graphene oxide solution with a concentration of 15 mg/mL is prepared by the existing Hummers method. Thereafter, the prepared graphene oxide solution and 98 wt % hydrazine hydrate solution are mixed at a mass ratio of 1:3, and reacted at the room temperature for 2 minutes. Then the product is diluted to obtain the reduced graphene oxide solutions with various concentrations for subsequent use.

Next, three PET films are cleaned and ultrasonically treated to remove the contaminants from the surfaces of the PET films.

The aqueous solutions of the light-curable adhesive S1 to S3 prepared in Examples 1-3 are respectively sprayed on the three PET films to form the first adhesive layer. Thereafter, the reduced graphene oxide solution is sprayed on the first adhesive layer to form the graphene layer. Then the first adhesive layer is cured under a light condition, wherein the light condition is that the film is exposed at a distance of 25 cm under a 1000 W medium pressure mercury lamp for 10 seconds.

Later the corresponding aqueous solutions of the light-curable adhesive and the reduced graphene oxide solution are sprayed alternatively on the film. After each time the reduced graphene oxide solution is sprayed, the film is placed at a distance of 25 cm under a 1000 W medium pressure mercury lamp for 10 seconds to cure the second adhesive layer. Finally, films M1, M2 and M3 that each has 30 graphene layers are obtained.

Example 5

Comparative example 1 uses PVC sheet for packing solid medicine, and comparative example 2 uses PVDC sheet for packing solid medicine.

The physical parameters of the films for medicine packaging M1, M2, M3, comparative example 1 and comparative example 2 of the same thickness and mass are measured according to national standards, and the obtained physical parameters are shown in Table 1:

TABLE 1 physical parameters of the films for medicine packaging

| Items | Unit | M1 | M2 | M3 | Comparative example 1 | Comparative example 2 |
|---|---|---|---|---|---|---|
| Water Vapor Transmission | g/m$^2$ · atm · day | 0.32 | 0.38 | 0.39 | 1.01 | 0.42 |
| Oxygen Transmission | cc/m$^2$ · atm · day | 0.21 | 0.33 | 0.35 | 12.27 | 0.523 |
| Tensile Strength (vertical/horizontal) | MPa | 65.3/64.7 | 63.9/62.7 | 64.1/63.4 | 66.2/65.3 | 56.7/55.7 |
| Hear-sealing Strength | N/15 mm | 10.9 | 11.1 | 10.8 | 11.5 | 10.8 |
| Heavy Metals | % | <0.0001 | <0.0001 | <0.0001 | <0.0001 | <0.0001 |
| Readily Oxidizable Substance | ml | <1.5 | <1.5 | <1.5 | <1.5 | <2 |
| Nonvolatile Matter | mg | <25 | <30 | <30 | <30 | <30 |
| Total Bacterial Count | unit/cm$^2$ | <1000 | <1000 | <1000 | <1000 | <1000 |
| Total Mold Count | unit/cm$^2$ | <100 | <100 | <100 | <100 | <100 |
| Colibacillus | unit/cm$^2$ | 0 | 0 | 0 | 0 | 0 |

Table 1 indicates that, with the same mass and thickness, compared with the comparative example land comparative example 2, the films for medicine packaging prepared in Examples 1-3 have remarkably lower water vapor transmission and oxygen transmission, and effectively inhibit small molecules such as oxygen and water vapor from penetrating into the packaging material, which avoids the oxidative deterioration of the active ingredients in the drugs and inhibits the propagation of microganisims, thereby prolonging the shelf life of the drugs.

Example 6

On the basis of Example 4, the preparation method of the reduced graphene oxide solution is improved.

1 g of graphite power is added to 23 ml of concentrated sulfuric acid. The reaction system is stirred until homogenous in an ice water bath. Then 2.5 g of potassium permanganate is added to the reaction system. The temperature of the water bath is controlled within a range of 10-15° C., and the reaction lasts for 2 hours. Thereafter, the reaction solution of the reaction system is transferred to a water bath to react at a constant temperature of 35° C. for 30 minutes. The reaction solution is stirred during reaction. Next, 80 ml of distilled water is added to the reaction solution, and the reaction last for 15 minutes at a temperature of 80° C. Then a certain amount of 15 wt % hydrogen peroxide is added to the reaction solution until generation of bubbles. The reaction solution is hot filtered, and the filter cake is washed with hydrochloric acid and deionized water until the filtrate is neutral. An aqueous solution of graphene oxide is prepared for subsequent use. Prior to using the aqueous solution of graphene oxide, the aqueous solution of graphene oxide is diluted with deionized water and then ultrasonically treated for 1 hour to obtain a graphene oxide solution having a concentration of 0.1-5 mg/mL.

Next, the prepared graphene oxide solution having a concentration of 5 mg/mL and 98 wt % hydrazine hydrate solution are mixed at a mass ratio of 1:3, and reacted at the room temperature for 2 minutes. Then the product is diluted to obtain the reduced graphene oxide solutions with various concentrations.

In such technical solution, the total reaction time is less than 3 hours which is far less than that of the existing Hummers method, and the steps such as standing step and drying step can be removed, effectively improving the production efficiency. On the other hand, the entire reaction process uses water as the solvent so that the preparation conditions are environmentally friendly, and the post-treatment process is simpler, lowering the production cost.

The aforementioned embodiments and examples further illustrate the purposes, technical solutions and beneficial effects of the present invention in detail. It is to be understood that the foregoing is only the embodiments of the present invention, and is not intended to limit the scope of the present invention. Any modifications, equivalent substitutes, improvements and the like made within the spirit and principle of the present invention should all be included in the scope of the present invention.

The invention claimed is:

1. A method of preparing a film for a medicine packaging, comprising a polymer film layer, wherein the polymer film layer is bonded with a graphene composite layer by a light-curable adhesive, the graphene composite layer comprises a plurality of graphene layers, and two adjacent graphene layers of the plurality of the graphene layers are bonded by the light-curable adhesive; and the light-curable adhesive comprises a hyperbranched cationic mussel-imitated polymer, and the hyperbranched cationic mussel-imitated polymer comprises a multi-hydroxylbenzoylbenzamide ene amide monomer, a cationic monomer, and a photo-responsive monomer, the method comprising the following steps:

(A) using a reversible addition fragmentation chain transfer polymerization method to prepare the hyperbranched cationic mussel-imitated polymer, and formulating the prepared hyperbranched cationic mussel-imitated polymer into an aqueous solution of the light-curable adhesive;

(B) preparing a reduced graphene oxide solution;

(C) spraying the aqueous solution of the light-curable adhesive prepared in the step (A) on the polymer film layer to form a first adhesive layer, then spraying the reduced graphene oxide solution prepared in the step (B) on the first adhesive layer to form one of the plurality of the graphene layers, and curing the first adhesive layer under a light condition;

(D) spraying the aqueous solution of the light-curable adhesive prepared in the step (A) on the one of the plurality of the graphene layers prepared in the step (C) to form a second adhesive layer, then spraying the reduced graphene oxide solution prepared in the step (B) on the second adhesive layer to form another one of the plurality of the graphene layers, and then curing the second adhesive layer under the light condition; and (E) repeating the step (D) until a desired number of layers of the plurality of the graphene layers in the graphene composite layer are achieved.

2. The method of claim 1, wherein the step (A) comprises the following steps:

(A1) adding an initiator, a RAFT agent, and a first reaction mixture to a vessel containing DMF to form a second reaction mixture;

(A2) stirring the second reaction mixture until homogenous, and introducing argon to a reaction system to remove oxygen therein;

(A3) heating and stirring the second reaction mixture to carry out a reaction;

(A4) after a product with a desired molecular weight is produced, the reaction system being exposed to air and cooled rapidly in a cold water bath to terminate the reaction;

(A5) purifying the product to obtain the hyperbranched cationic mussel-imitated polymer; and (A6) formulating the hyperbranched cationic mussel-imitated polymer into the aqueous solution of the light-curable adhesive having a concentration of 0.5-5 mg/mL;

wherein the first reaction mixture comprises the multi-hydroxylbenzoylbenzamide ene amide monomer, the cationic monomer, the photo-responsive monomer, poly(ethylene glycol) diolefine acid ester, and poly (ethylene glycol) olefine acid ester.

3. The method of claim 2, wherein the multi-hydroxylbenzoylbenzamide ene amide monomer has a molar percentage of 20-40%, the cationic monomer has a molar percentage of 30-40%, the photo-responsive monomer has a molar percentage of 1-5%, poly(ethylene glycol) olefine acid ester has a molar percentage of 20-40%, and poly (ethylene glycol) diolefine acid ester has a molar percentage of 5-10%.

4. The method of claim 2, wherein in the step (A1), the initiator, the RAFT agent, and the first reaction mixture are in a molar ratio of 1:2:100.

5. The method of claim 2, wherein the initiator is 1,1-azobis(cyclohexanecarbonitrile), 2,2'-azobis(2-methylpropionitrile), or 4,4'-azobis(4-cyanovaleric acid); and the RAFT agent is any one of 2-(dodecyltrithiocarbonate)-2-methylpropionic acid, 4-cyano-4-(phenylthioformylthio)pentanoic acid, and 2-cyano-2-propyl-4-cyanobenzene dithiocarbonate.

6. The method of claim 1, wherein the step (B) comprises the following steps:

(B1) adding graphite powder to concentrated sulfuric acid, stirring until homogenous in an ice water bath and then adding potassium permanganate, controlling a temperature of the ice water bath within a range of 10-15° C., and reacting for 2 hours;

(B2) transferring a reaction solution obtained in step (B1) to a water bath to react at a constant temperature of 35° C. for 30 minutes, continually stirring the reaction solution and adding distilled water to the reaction solution, and thereafter reacting at a temperature of 80° C. for 15 minutes;

(B3) adding a certain amount of 15 wt % hydrogen peroxide to the reaction solution until generation of bubbles, hot filtering the reaction solution, washing a filter cake with hydrochloric acid and deionized water until a filtrate is neutral, and obtaining an aqueous solution of graphene oxide;

(B4) diluting the aqueous solution of graphene oxide with deionized water, and ultrasonically treating the aqueous solution of graphene oxide for 1 hour to obtain a graphene oxide solution having a concentration of 0.1-5.0 mg/mL; and (B5) mixing the prepared graphene oxide solution and a reducing agent at a mass ratio of 1:3, reacting at a room temperature for 2 minutes, and diluting to obtain the reduced graphene oxide solution with a required concentration.

* * * * *